US007342944B2

(12) United States Patent
Schröder et al.

(10) Patent No.: US 7,342,944 B2
(45) Date of Patent: Mar. 11, 2008

(54) METHOD AND APPARATUS FOR DECODING A CODED DIGITAL AUDIO SIGNAL WHICH IS ARRANGED IN FRAMES CONTAINING HEADERS

(75) Inventors: Ernst F Schröder, Hannover (DE); Johannes Böhm, Göttingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 540 days.

(21) Appl. No.: 10/493,286

(22) PCT Filed: Oct. 11, 2002

(86) PCT No.: PCT/EP02/11388

§ 371 (c)(1), (2), (4) Date: Apr. 22, 2004

(87) PCT Pub. No.: WO03/036622

PCT Pub. Date: May 1, 2003

(65) Prior Publication Data

US 2004/0247035 A1 Dec. 9, 2004

(30) Foreign Application Priority Data

Oct. 23, 2001 (EP) ................................. 01250372
Mar. 1, 2002 (EP) ................................. 02090082

(51) Int. Cl.
*H04J 3/06* (2006.01)

(52) U.S. Cl. ...................... 370/503; 370/514; 375/253; 375/242; 375/246

(58) Field of Classification Search ................ 375/253, 375/246, 242; 370/503, 514; 381/2; 700/94
See application file for complete search history.

(56) References Cited

U.S. PATENT DOCUMENTS 5,973,629 A * 10/1999 Fujii ........................... 341/76

(Continued)

FOREIGN PATENT DOCUMENTS

EP 402973 12/1990

(Continued)

OTHER PUBLICATIONS

Search Report dated Jan. 22, 2003.

*Primary Examiner*—Mohammed Ghayour
*Assistant Examiner*—Sonia J King
(74) *Attorney, Agent, or Firm*—Joseph J. Laks; Paul P. Kiel

(57) ABSTRACT

With audio data reduction on the basis of ISO/IEC standard 11172-3, a frame length varying by 8 bits is used at a sampling frequency of 44.1 kHz in order to arrive, on average, at a particular fixed data rate. The lengthening of a data frame is signalled by a padding bit in the header of the frames. The invention dispenses with evaluation of the padding bit. Instead, the mean frame length L is calculated, L is rounded down to the next integer, for the subsequent frame it is first established whether the expected sync word for this frame appears, and, if this is so, this frame is decoded without taking into account the padding bit, but if the expected sync word for this frame does not appear, the decoding of the frame is started one 8-bit later without taking into account the padding bit.

5 Claims, 2 Drawing Sheets

U.S. PATENT DOCUMENTS 5,990,963 A * 11/1999 Mishima et al. ....... 375/240.24
6,175,599 B1 * 1/2001 Lyon et al. ................. 375/261
6,714,826 B1 * 3/2004 Curley et al. ................. 700/94
7,003,042 B2 * 2/2006 Morelos-Zaragoza et al. .......................... 375/253
7,116,736 B2 * 10/2006 Blaum et al. ............... 375/354

FOREIGN PATENT DOCUMENTS

WO 00/51243 8/2000

* cited by examiner

METHOD AND APPARATUS FOR DECODING A CODED DIGITAL AUDIO SIGNAL WHICH IS ARRANGED IN FRAMES CONTAINING HEADERS

This application claims the benefit, under 35 U.S.C. § 365 of International Application PCT/EP02/11388, filed Oct. 11, 2002, which was published in accordance with PCT Article 21(2) on May 1, 2003 in English and which claims the benefit of European patent application No. 01250372.8, filed Oct. 23, 2001 and European patent application No. 02090082.5 filed Mar. 1, 2002.

The invention relates to a method and an apparatus for decoding a coded digital audio signal which is arranged in frames containing headers.

PRIOR ART

When using audio data reduction on the basis of ISO/IEC standards 11172-3 and 13818-3, a frame length varying by 8 bits is used at a sampling frequency of 44.1 kHz in order to arrive, on average, at a particular fixed data rate (e.g. 128 000 bits/sec). The 'lengthening' of a data frame is signalled by the "padding bit" in the header of a frame. This method is described more accurately in EP-A-0402973. The frames initially also contain a sync word.

INVENTION

The evaluation of this padding bit in the decoder can cause difficulties. By way of example, in highly optimized decoders, the digital signal processors (DSP) they contain require very sparing use of storage space. Since, however, the header in a frame is read at the start of decoding of the frame, but the value of the padding bit is not needed until right at the end of decoding of this frame, in a DSP implementation an entire storage location (an integer value of, by way of example, several bytes in length) is typically wasted on merely storing the value of the padding bit.

It would be possible to achieve a reduction in the required storage space by dispensing with the 'padding', i.e. the frame lengths would always be kept constant even at a sampling frequency of 44.1 kHz. However, a particular fixed data rate of, by way of example, 128 000 bits/sec is then no longer obtained, but rather a value which is 0.23% lower. A decoder which relies upon a constant frame length always being used even at a sampling frequency of 44.1 kHz would no longer be compatible with the aforementioned ISO/IEC standard, however.

The invention is based on the object of specifying a method which allows less storage space to be used but maintains the compatibility with the ISO/IEC standards 11172-3 and 13818-3 or with similar standards. This object is achieved by the method specified in Claim 1. A decoder using this method is specified in Claim 5.

In accordance with the invention, the data frames of varying length are evaluated on the basis of the respective length, but evaluation of the padding bit from the header is avoided. Since the value of the padding bit is normally used to ascertain the exact position of the start of the next frame, the invention involves ascertaining the start of the next frame in another way, namely by calculating a mean frame length and a rounding-down or rounding-up of this mean frame length to the closest integer byte values for the received frames.

The advantage is that the value of the padding bit does not need to be stored for the entire time taken for decoding a frame, and hence storage space can be saved more frugally.

In principle, the inventive method relates to the decoding of a coded digital audio signal which is arranged in frames containing headers, where the header in a frame contains a respective information item regarding whether this frame has a standard length or a length which differs therefrom for some of the frames, and where the frames contain a respective sync word, having the following steps:

- the length-variation information regarding the respective frame length is not stored or evaluated;
- the approximate start of the next frame is determined using the following formula:

$$L=N*R/fs/SL,$$

- where L is equal to the length of the frames, N is equal to the number of samples per frame, R is equal to the total data rate, fs is equal to the sampling frequency, SL is equal to the stipulated subunit for indicating the frame length;
- L is rounded down to the next integer of subunits SL;
- for the subsequent frame, it is first established whether the expected sync word for this frame appears;
- if the expected sync word for this frame appears, this subsequent frame is decoded without taking into account the length-variation information;
- if the expected sync word for this frame does not appear, the decoding of this subsequent frame is started one subunits later without taking into account the length-variation information.

In principle, the inventive apparatus relates to a decoder for decoding a coded digital audio signal which is arranged in frames containing headers, where the header in a frame contains a respective information item regarding whether this frame has a standard length or a length which differs therefrom for some of the frames, and the frames contain a respective sync word, where, for ascertaining the frame length, the length-variation information regarding the respective frame length is not stored or evaluated, and where the apparatus contains:

- means for decoding the audio signal;
- a frame-start estimator in which the approximate start of the next frame is determined using the following formula:

$$L=N*R/fs/SL,$$

- where L is equal to the length of the frames, N is equal to the number of samples per frame, R is equal to the total data rate, fs is equal to the sampling frequency, SL is equal to the stipulated subunit, and in which L is rounded down to the next integer of subunits SL;
- a sync-word checker which, for the subsequent frame, first establishes whether the expected sync word for this frame appears, where, if the expected sync word for this frame appears, this subsequent frame is decoded in the decoding means without taking into account the length-variation information, and, if the expected sync word for this frame does not appear, the decoding of this subsequent frame is started in the decoding means one subunit SL later without taking into account the length-variation information.

Instead of evaluating the sync word, another known and expected data pattern can also be evaluated.

DRAWINGS

Exemplary embodiments of the invention are described with reference to the drawings, in which.

EXEMPLARY EMBODIMENTS

In data-reducing coding and decoding methods for audio signals, such as in ISO/IEC 11172-3 (MPEG audio), the coded audio signals are stored or transmitted in data frames which respectively contain a fixed number N of audio samples, e.g. 1152 samples. The data frames have, in principle, a fixed length which is a multiple of a basic unit, which is called a 'slot' in ISO/IEC 11172-3 and has a length of 8 bits in the 'layer 2' and 'layer 3' variants.

Figure 1:
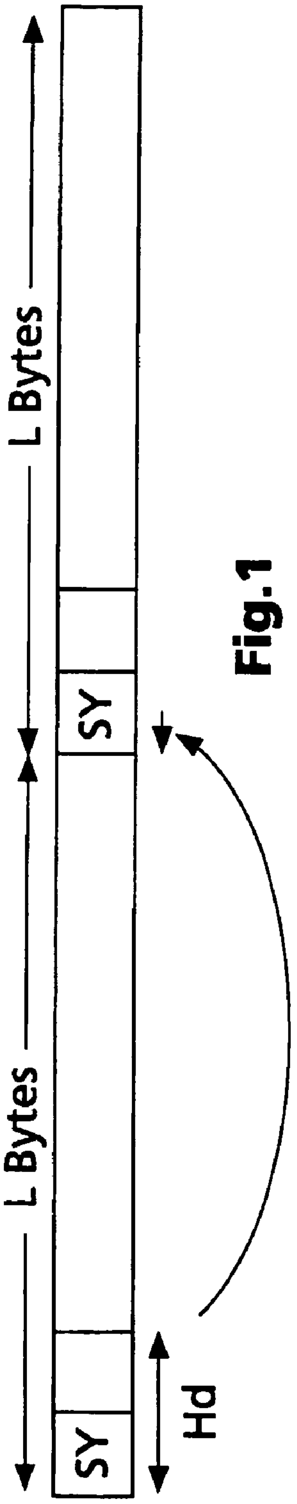
FIG. 1 shows two successive data frames having the same length.

In FIG. 1, each of the successive frames of the same length of L bytes has a header Hd which contains a sync word SY. The size of the subunit SL is 1 byte=8 bits in this example.

If audio signals having sampling frequencies fs of 32 000 Hz or 48 000 Hz are used, then the relationship between the total data rate R (in bits/sec) and the frame length L (in slots) is as follows:

$$L=N*R/fs/8 \quad (1)$$

Example:

N=1152 samples; R=128 000 bits/sec; fs=48 000 Hz gives L=384 slots of 8 bits each.

If, however, a sampling frequency of 44 100 Hz is used, then non-integer values for L are produced in (1). In this way, the start of the next frame is determined only approximately. Example:

N=1152 samples; R=128 000 bits/sec; fs=44 100 Hz gives L=417.9591837 slots of 8 bits each.

However, since a frame can only have an integer number of slots, a frame length which varies by 1 slot (=8 bits) is used at a sampling frequency of 44.1 kHz in order to arrive, on average, at a particular fixed data rate (e.g. R=128 000 bits/sec) and is signalled, as described above, using the padding bit in the header. When the result from formula (1) is rounded down, the correct frame start is often obtained for a sampling frequency of 44.1 kHz, namely for those frames which have not been lengthened by 1 slot. Often, however, an incorrect value is also obtained for the frame start. If the next frame starts to be decoded at this incorrect point, then an error is obtained, since the sync word to be expected at the start of the frame obviously does not appear.

Normally, decoders then switch to an error recovery mode and start a fresh complex search for a sync word. This typically produces a fault in the decoded output signal.

Figure 2:
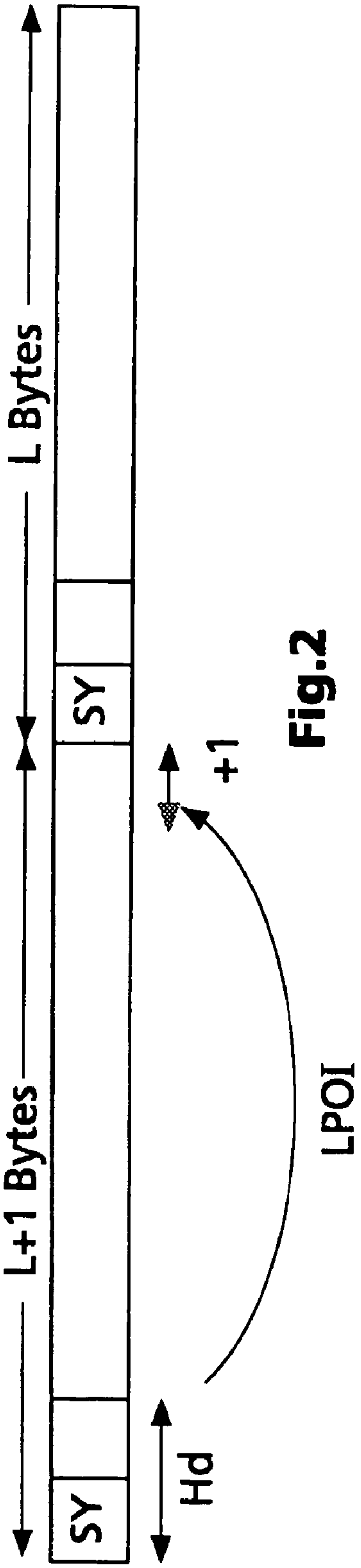
FIG. 2 shows two successive data frames having different lengths.

In FIG. 2, the first frame is one unit SL longer than the second frame, i.e. L+1 bytes. If decoding starts at the place pointed at by the pointer LPOI for the calculated and rounded-down variable L, then no sync word is found at that place. For this reason, a check is carried out one unit SL further on to determine whether a sync word is present, and this sync word is found at that place.

The invention therefore proposes, when decoding encoded signals having the sampling frequency 44 100 Hz or 22 050 Hz:

not storing or evaluating the padding bit;

determining the approximate start of the next frame using the formula (1);

rounding down the result from (1) to the next integer;

for the subsequent frame, first establishing whether the expected sync word or another known data pattern appears;

if this is the case, decoding this subsequent frame without taking into account the padding bit;

if this is not the case, starting the decoding of this subsequent frame one slot later without taking into account the padding bit.

Figure 3:
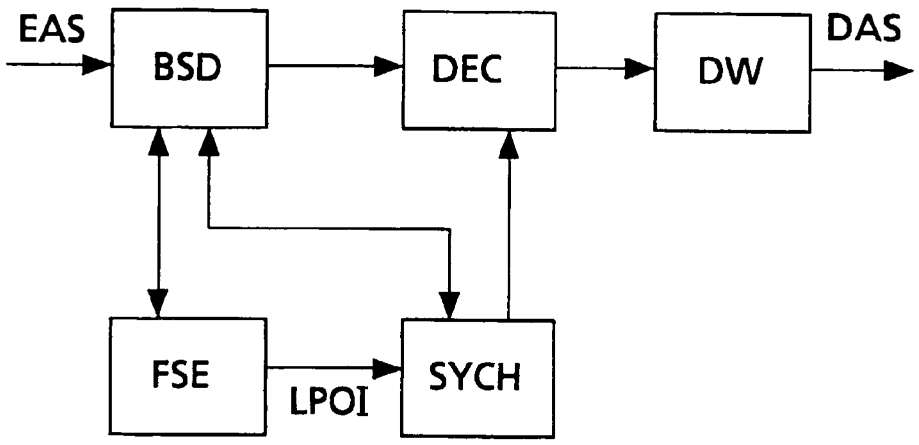
FIG. 3 shows a decoder in accordance with the invention.

FIG. 3 shows an inventive decoder which receives a coded audio signal EAS which is supplied to a bit stream deformatter BSD. BSD interchanges corresponding data with a frame-start estimator FSE. The frame start address estimated therein or a corresponding pointer LPOI is used to establish, in a sync word checker SYCH, whether there is a sync word at the appropriate point in the data stream. If this is so, a decoder stage DEC and/or the bit stream deformatter BSD receives the information which prompts the further processing or decoding of the next data frame to start at that point. The audio signal decoded in the frequency domain is supplied by the decoder stage DEC to a windowing stage DW which multiplies portions of the audio signal using a synthesis filter, for example, converts them to the time domain and outputs a decoded audio signal DAS.

The invention can also be used for related applications in which a non-integer result from (1) causes a variation in the frame length and said variation is indicated using an information item similar to a 'padding bit'.

The invention claimed is:

1. Method for decoding a coded digital audio signal which is arranged in frames containing headers, where the header in a frame contains a respective information item regarding whether this frame has a standard length or a length which differs therefrom for some of the frames, and where the frames contain a respective sync word, comprising the following steps:

determining the approximate start of the next frame using the following formula:

$$L=N*R/fs/SL,$$

where L is equal to the length of the frames, N is equal to the number of samples per frame, R is equal to the total data rate, fs is equal to the sampling frequency, SL is equal to the stipulated subunit for indicating the frame length:

rounding L down to the next integer of subunits SL:

establishing, for the subsequent frame, whether the expected sync word for this frame appears;

if the expected sync word for this frame appears, decoding this subsequent frame without taking into account the length-variation information;

if the expected sync word for this frame does not appear, starting the decoding of this subsequent frame one subunit later without taking into account the length-variation information, wherein the steps are performed without storing or evaluating the length-variation information regarding the respective frame length.

2. Method according to claim 1, where the parameters for calculating the formula for the approximate frame start comprise known parameters in a transmission system.

3. Method according to claim 2, where at least one of the parameters is transmitted in the header of frames.

4. Method according to claim 1, where, instead of establishing whether an expected sync word appears, establishing whether another known pattern appears in the next frame.

5. Apparatus for decoding a coded digital audio signal which is arranged in frames containing headers, where the header in a frame contains a respective information item regarding whether this frame has a standard length or a length which differs therefrom for some of the frames, and the frames contain a respective sync word, where, for ascertaining the frame length, the length-variation information regarding the respective frame length is not stored or evaluated, and where the apparatus comprises:

means for decoding the audio signal;

a frame-start estimator in which the approximate start of the next frame is determined using the following formula:

$$L=N*R/fs/SL,$$

where L is equal to the length of the frames, N is equal to the number of samples per frame, R is equal to the total data rate, fs is equal to the sampling frequency, SL is equal to the stipulated subunit, and in which L is rounded down to the next integer of subunits SL;

a sync-word checker which, for the subsequent frame, first establishes whether the expected sync word for this frame appears, where, if the expected sync word for this frame appears, this subsequent frame is decoded in the decoding means without taking into account the length-variation information, and, if the expected sync word for this frame does not appear, the decoding of this subsequent frame is started in the decoding means one subunit SL later without taking into account the length-variation information.

* * * * *